United States Patent
Hsu

(10) Patent No.: US 9,063,219 B2
(45) Date of Patent: Jun. 23, 2015

(54) OPTICAL TOUCH SYSTEM

(71) Applicant: PIXART IMAGING INC., Hsinchu (TW)

(72) Inventor: En-Feng Hsu, Hsinchu (TW)

(73) Assignee: Pixart Imaging Inc., Hsin-chu (TW)

(*) Notice: Subject to any disclaimer, the term of this patent is extended or adjusted under 35 U.S.C. 154(b) by 322 days.

(21) Appl. No.: 13/645,295

(22) Filed: Oct. 4, 2012

(65) Prior Publication Data
US 2013/0088576 A1    Apr. 11, 2013

(30) Foreign Application Priority Data
Oct. 5, 2011   (TW) .............................. 100135998 A

(51) Int. Cl.
| | | |
|---|---|---|
| H04N 7/18 | (2006.01) | |
| G01S 7/48 | (2006.01) | |
| H04N 13/02 | (2006.01) | |
| G06T 7/00 | (2006.01) | |

(Continued)

(52) U.S. Cl.
CPC ............... *G01S 7/4802* (2013.01); *H04N 7/18* (2013.01); *H04N 13/0271* (2013.01); *G06T 7/0073* (2013.01); *G06T 2207/10152* (2013.01); *G06K 9/2018* (2013.01); *G06K 9/2027* (2013.01); *G01S 17/08* (2013.01); *G01S 17/89* (2013.01)

(58) Field of Classification Search
CPC . H04N 13/0271; H04N 7/18; H04N 13/0239; H04N 13/0055; H04N 13/0296; H04N 13/0497; H04N 13/0242; G06T 7/0073; G06T 2207/10152; G01S 7/4802; G01S 17/08; G01S 17/89; G06K 9/2027; G06K 9/2018; A61K 48/00; C12N 15/87; C12N 15/88
USPC ............................................................ 348/46
See application file for complete search history.

(56) References Cited

U.S. PATENT DOCUMENTS 5,903,303 A * 5/1999 Fukushima et al. ............ 348/47
6,057,909 A * 5/2000 Yahav et al. ................. 356/5.04

(Continued)

FOREIGN PATENT DOCUMENTS

| CN | 1194056 A | 9/1998 |
|---|---|---|
| CN | 101996401 A | 3/2011 |

(Continued)

OTHER PUBLICATIONS

Office Action from Republic of China, Taiwan Patent Office in a corresponding Patent Application No. 100135998 dated Dec. 26, 2013, 11 pages in Chinese and 1 page of abstract in English.

(Continued)

*Primary Examiner* — Shan Elahi
(74) *Attorney, Agent, or Firm* — Juan Carlos A. Marquez; Bacon & Thomas PLLC

(57) ABSTRACT

An image system comprises a light source, an image sensing device, and a computing apparatus. The light source is configured to illuminate an object comprising at least one portion. The image sensing device is configured to generate a picture comprising an image. The image is produced by the object and comprises at least one part corresponding to the at least one portion of the object. The computing apparatus is configured to determine an intensity value representing the at least one part and to determine at least one distance between the at least one portion and the image sensing device using the intensity value and a dimension of the at least one part of the image.

30 Claims, 12 Drawing Sheets

(51) Int. Cl.
*G06K 9/20* (2006.01)
*G01S 17/08* (2006.01)
*G01S 17/89* (2006.01)

(56) References Cited

U.S. PATENT DOCUMENTS

| | | | |
|---|---|---|---|
| 6,791,531 B1* | 9/2004 | Johnston et al. | 345/157 |
| 7,128,270 B2* | 10/2006 | Silverbrook et al. | 235/472.01 |
| 7,170,632 B1* | 1/2007 | Kinjo | 358/1.9 |
| 8,447,143 B2* | 5/2013 | Matsuguma et al. | 382/310 |
| 8,730,396 B2* | 5/2014 | Kumaraswamy et al. | 348/575 |
| 2002/0054759 A1* | 5/2002 | Sasaki et al. | 396/30 |
| 2003/0117396 A1* | 6/2003 | Yoon | 345/419 |
| 2004/0190092 A1* | 9/2004 | Silverbrook et al. | 358/539 |
| 2006/0050014 A1* | 3/2006 | Yoon | 345/6 |
| 2007/0152133 A1* | 7/2007 | He et al. | 250/208.1 |
| 2007/0165048 A1* | 7/2007 | Yamashita et al. | 345/601 |
| 2008/0068478 A1* | 3/2008 | Watanabe | 348/294 |
| 2008/0144964 A1* | 6/2008 | Soinio et al. | 382/275 |
| 2009/0077504 A1* | 3/2009 | Bell et al. | 715/863 |
| 2010/0230729 A1* | 9/2010 | Ellis-Monaghan et al. | 257/228 |
| 2010/0245765 A1* | 9/2010 | Dyer et al. | 351/206 |
| 2011/0122287 A1* | 5/2011 | Kunishige et al. | 348/229.1 |
| 2011/0128384 A1* | 6/2011 | Tiscareno et al. | 348/164 |
| 2011/0175983 A1* | 7/2011 | Park et al. | 348/46 |
| 2012/0242795 A1* | 9/2012 | Kane et al. | 348/46 |
| 2012/0292484 A1* | 11/2012 | Cieslinski | 250/208.1 |

FOREIGN PATENT DOCUMENTS

| | | |
|---|---|---|
| CN | 102136139 A | 7/2011 |
| EP | 1 570 645 B1 | 9/2006 |
| TW | 201110690 A1 | 3/2011 |
| TW | 201126703 A1 | 8/2011 |
| WO | WO 2009/077378 A1 | 6/2009 |

OTHER PUBLICATIONS

Office Action from Republic of China Intellectual Property Office in the corresponding Taiwan application 100135998 dated Jun. 30, 2014, 4 pp., with partial English translation.

Office Action from Republic of China Intellectual Property Office in the corresponding Chinese application 201110302860.7 dated Jan. 12, 2015, 7 pp. with partial English translation; and Search Report, 2 pp.in Chinese.

* cited by examiner

OPTICAL TOUCH SYSTEM

CROSS-REFERENCE TO RELATED APPLICATION

The present application is based on, and claims priority from, Taiwan Patent Application Serial Number 100135998, filed on Oct. 5, 2011, the disclosure of which is hereby incorporated by reference herein in its entirety.

BACKGROUND

1. Technical Field

The present invention relates to an image system.

2. Related Art

A time-of-flight camera (TOF camera) is a camera system that creates distance data with the time-of-flight (TOF) principle. The simplest version of a time-of-flight camera uses light pulses. The illumination is switched on for a very short time, and the generated light pulse illuminates the scene and is reflected by the objects. The camera lens gathers the reflected light, forming images onto the sensor plane. Depending on the distances, the incoming light may experience a delay. The camera has photo diodes (PDs), which convert incoming light into currents. In analog timing imagers, connected to the photo diode are fast switches, which direct the current to one of plural memory elements (e.g. a capacitor). In digital timing imagers, a time counter, running at several gigahertz, is connected to each photo detector and stops counting when light is sensed.

In an analog timer, a PD pixel uses two switches and two memory elements. The switches are controlled by a pulse with the same length as the light pulse, where the control signal of one switch is delayed by exactly the pulse width. Depending on the delay, different amounts of electrical charge are respectively stored in the two memory elements. The distance from the camera to the object can be estimated by comparing the amounts of electrical charge stored in the two memory elements.

Light generated for being sensed by TOF cameras illuminates the complete scene. Light may go through different paths before it arrives at the object, causing the estimated distance to be greater than the actual distance.

SUMMARY

One embodiment of the present invention provides an image system, which comprises a light source, an image sensing device, and a computing apparatus. The light source is configured to illuminate an object comprising at least one portion. The image sensing device is configured to generate a picture. The picture comprises an image produced by the object. The image comprises at least one part corresponding to the at least one portion of the object. The computing apparatus is configured to determine an intensity value representing the at least one part of the image and to determine at least one distance between the at least one portion of the object and the image sensing device using the intensity value and a dimension of the at least one part of the image.

Another embodiment of the present invention provides an image system, which comprises a light source, an image sensing device, and a computing apparatus. The light source is configured to illuminate an object. The object comprises a first portion and a second portion connected with the first portion. The first portion comprises reflectance different from that of the second portion. The image sensing device is configured to generate a picture comprising an image produced by the object. The image comprises a first part corresponding to the first portion of the object and a second part corresponding to the second portion of the object. The computing apparatus is configured to determine the reflectance of the second portion of the object using an intensity value representing the first part of the image and an intensity value representing the second part of the image.

Another embodiment of the present invention provides an image system, which comprises a light source, an image sensing device, and a computing apparatus. The light source is configured to illuminate an object. The image sensing device is configured to generate, in sequence, a first picture and a second picture. The first and second pictures respectively comprise an image produced by the object. The computing apparatus is configured to determine a distance between the object and the image sensing device by the image of the first picture. The computing apparatus is further configured to determine a first intensity value representing the image of the first picture and a second intensity value representing the image of the second picture and corresponding to the first intensity value. Moreover, the computing apparatus is configured to determine a travel distance of the object from the time that the first picture is generated until the time that the second picture is generated using the first intensity value, the second intensity value, and the distance.

Another embodiment of the present invention provides an image system, which comprises a light source, an image sensing device, and a computing apparatus. The light source is configured to illuminate an object comprising a plurality of portions. The image sensing device is configured to generate a plurality of pictures. Each picture comprises an image produced by the object. Each image comprises a plurality of parts corresponding to the plurality of portions of the object. The computing apparatus is configured to generate motion signals corresponding to the plurality of portions of the object according to changes in positions and intensity values of the plurality of parts of the images.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The image system of some embodiments of the present invention may detect the intensity value of a portion of an object, calculate a distance between the portion of an object and an image sensing device of the image system, and calculate another distance between another portion of the object and the image sensing device, the reflectance of the another portion, the relative positions of the two portions using the intensity value and the distance, or the distance that the object moves in a time interval. In some embodiments, the distance between a portion of the object and the image sensing device can be the distance measured from the portion of the object to the image sensing device of the image system. In some embodiments, the distance between a portion of the object and the image sensing device can be the distance measured from any location adjacent to the portion of the object to the image sensing device.

Figure 1:
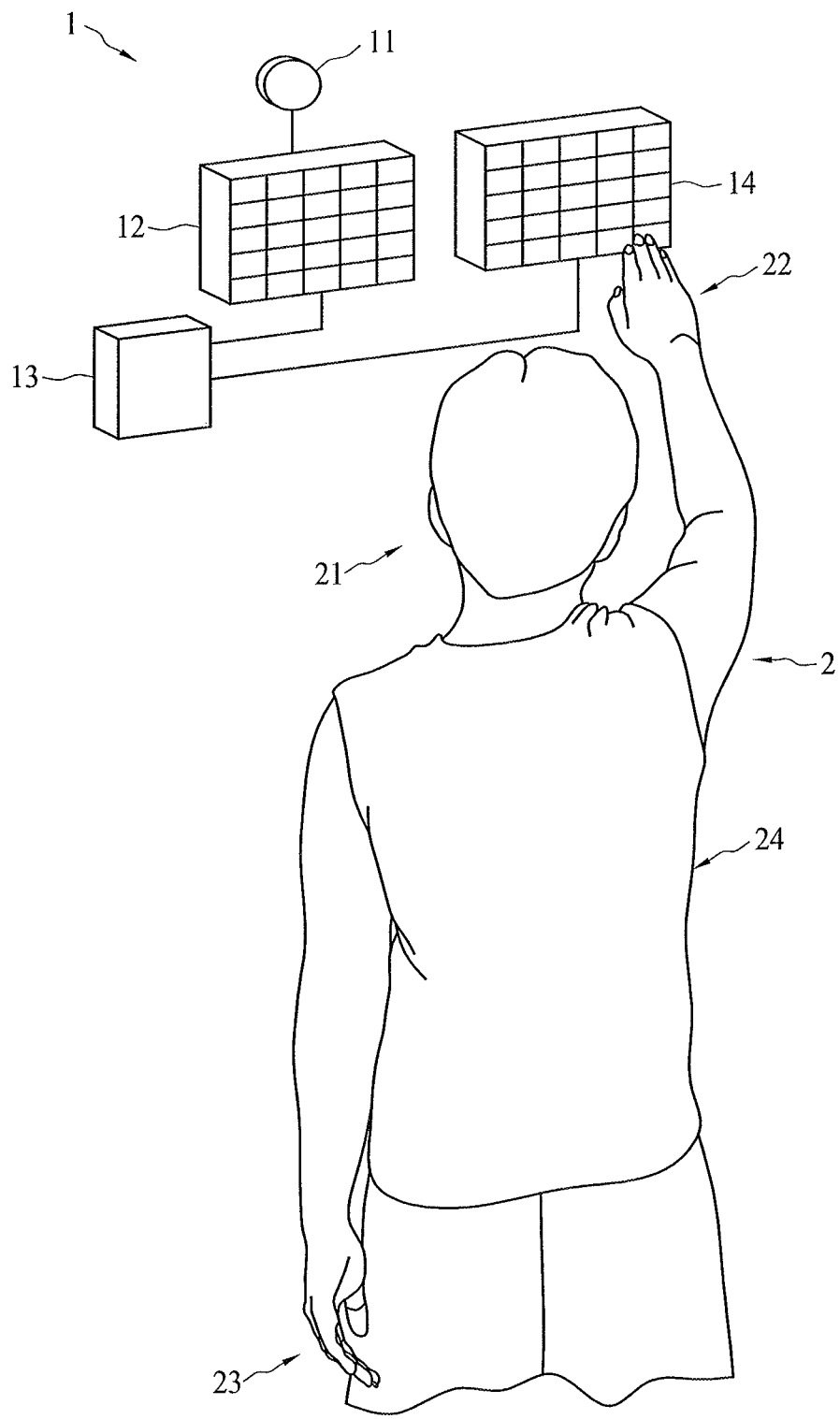
FIG. 1 is a schematic illustration depicting an image system configured to take an image of an object according to one embodiment of the present invention.
Figure 2:
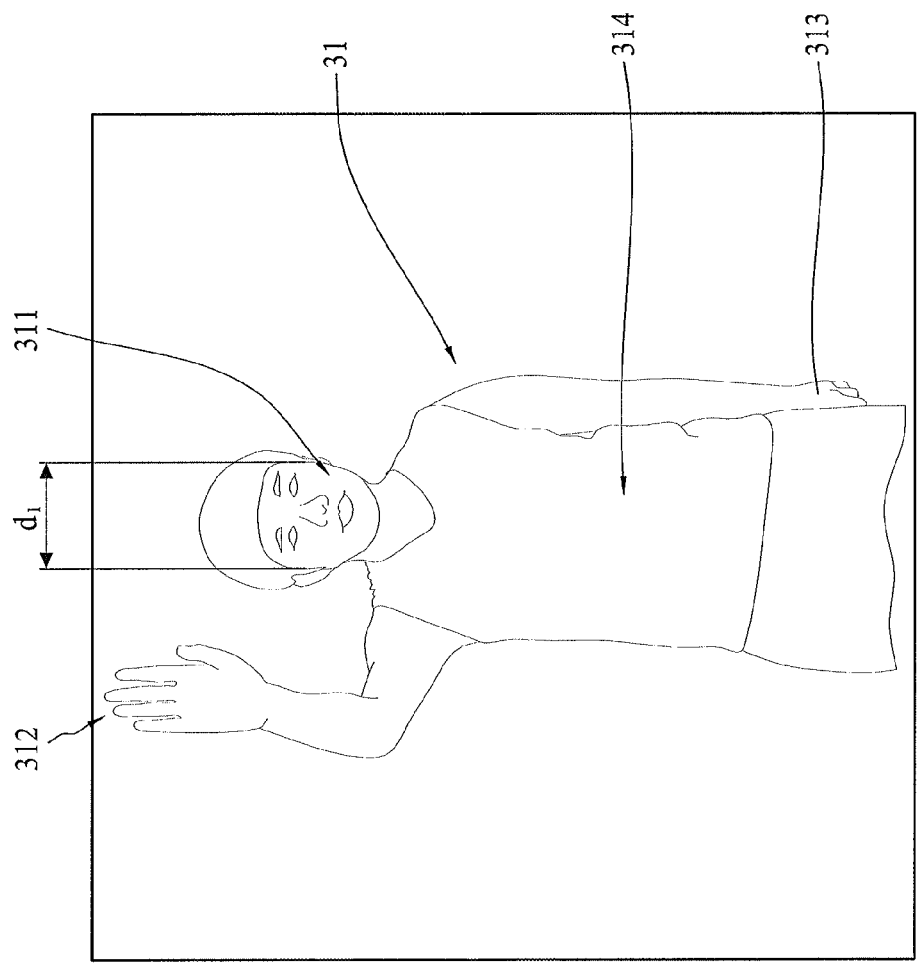
FIG. 2 is a schematic illustration of a picture according to one embodiment of the present invention.

FIG. 1 is a schematic illustration depicting an image system configured to take an image of an object 2 according to one embodiment of the present invention. FIG. 2 is a schematic illustration of a picture according to one embodiment of the present invention. Referring to FIGS. 1 and 2, the image system 1 comprises a light source 11, an image sensing device 12, and a computing apparatus 13. The light source 11 is configured to illuminate an object 2 that may comprise a plurality of portions (21, 22, 23 and 24). The image sensing device 12 may generate a picture 3 as shown in FIG. 2. The picture 3 may comprise an image 31 created by the object 2 under illumination by electromagnetic radiation. The image 31 may comprise a plurality of parts (311, 312, 313, and 314) corresponding to the plurality of portions (21, 22, 23 and 24). The computing apparatus 13 is configured to determine the intensity values representing the plurality of parts (311, 312, 313, and 314), respectively. The computing apparatus 13 can be further configured to determine distances between the plurality of portions (21, 22, 23 and 24) and the image sensing device 12 using a dimension of one of the plurality of parts (311, 312, 313, and 314) and the intensity values. With the distance values, a three-dimensional image of the object 2 can be constructed.

When light from the light source 11 emits on the object 2, the object 2 reflects the light, and the image sensing device 12 receives a portion of the reflected light. Due to different distances from the image sensing device 12, the image 31 of the object 2 exhibit significantly varied intensity distributions. In addition, the object 2 may comprise a plurality of portions having different reflectance. The portion with a higher reflectance reflects more light, creating a brighter part in the image, while the portion with a lower reflectance reflects less light, creating a darker part in the image.

Figure 3:
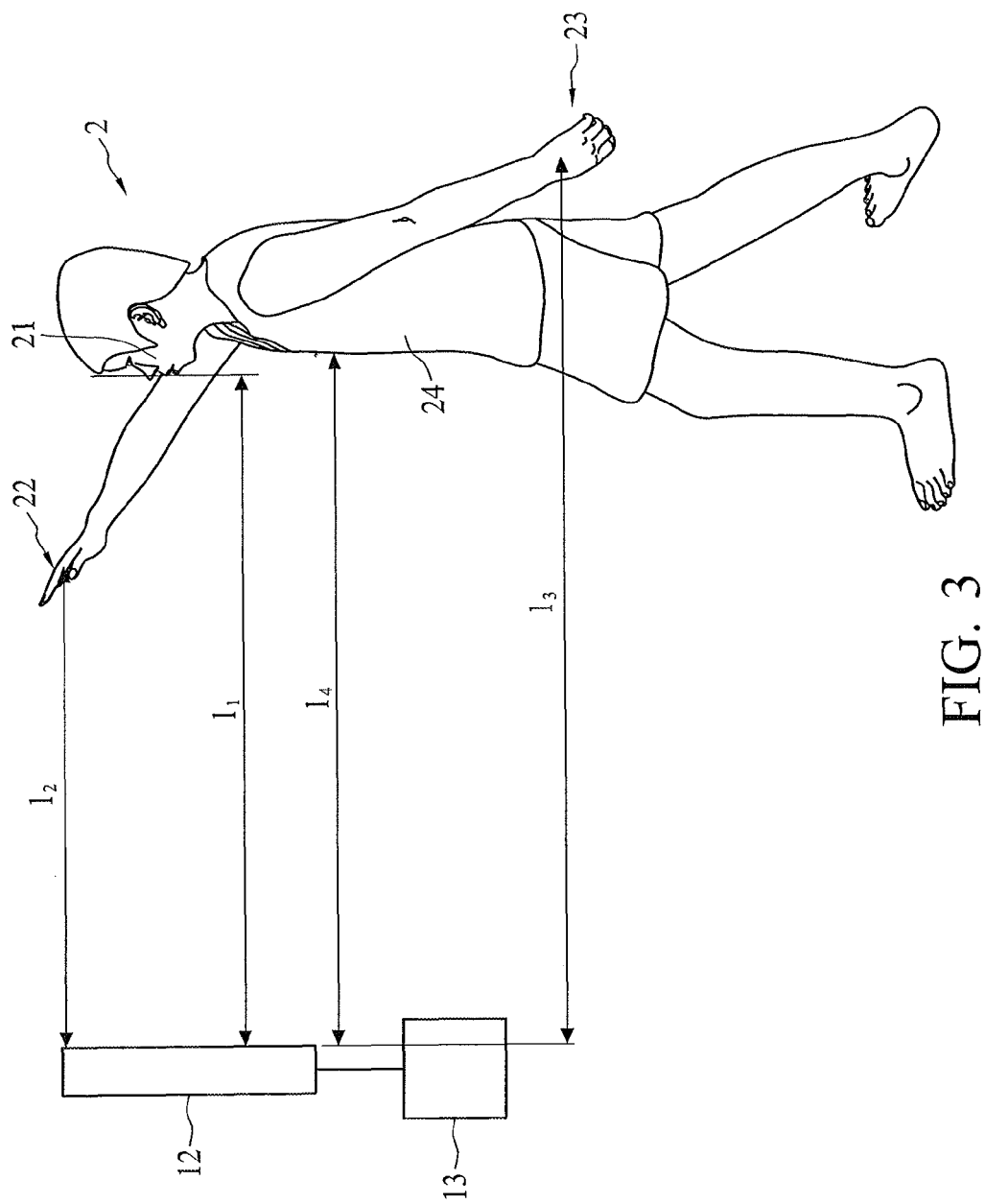
FIG. 3 schematically demonstrates distances between the portions of an object and an image sensing device according to one embodiment of the present invention.

In some embodiments, the object 2 may be any substance in the real world. In some embodiments, the object 2 can be, but is not limited to, a human being. As shown in FIG. 3, when the object 2 is a human being, the object 2 may comprise a plurality of portions (21, 22, 23, and 24), such as a face portion 21, a hand portion 22, another hand portion 23 and a body portion 24. Each portion is differently distanced from the image sensing device 12. The face portion 21 corresponds to the face part 311 of the image 31; the hand portion 22 corresponds to the hand part 312 of the image 31; the hand portion 23 corresponds to the hand part 313 of the image 31; and the body portion 24 corresponds to the body part 314 of the image 31.

Normally, a specified physical quantity or intensity is inversely proportional to the square of the distance from the source of that physical quantity (i.e., inverse-square law). Accordingly, the relative positions of the face portion 21, the hand portion 22, and the hand portion 23 can be determined by the intensity values respectively representing the face part 311, the hand part 312, and the hand part 313. After the computing apparatus 13 analyzes the picture 3, it can be found that the intensity value representing the hand part 312 is higher than the intensity value representing the face part 311, and the intensity value representing the face part 311 is higher than the intensity value representing the hand part 313. With the analyzed result, the computing apparatus 13 can determine either of the following: the hand portion 22 of the object 2 is closer to the image sensing device 12 than the face portion 21; or the hand portion 22 of the object 2 is in front of the face portion 21, and that the hand portion 23 of the object 2 is farther away from the image sensing device 12 than the face portion 21; or the hand portion 23 of the object 2 is behind the face portion 21.

In some embodiments, the intensity value representing the face part 311, the hand part 312 or the hand part 313 of the image 31 can be an average of the intensities of all pixels of the face part 311, the hand part 312 or the hand part 313. In some embodiments, the intensity value representing the face part 311, the hand part 312 or the hand part 313 of the image 31 can be an average of the intensities of a portion of pixels of the face part 311, the hand part 312 or the hand part 313.

Moreover, the distances between the portions of the object 2 having different intensity values and the image sensing device 12 can be further determined by the intensity distribution and the theory on thin lenses.

As shown in FIGS. 2 and 3, the computing apparatus 13 can determine the intensity value $I_1$ of the face part 311 of the image 31, the intensity value $I_2$ of the hand part 312 of the image 31, and the intensity value $I_3$ of the hand part 313 of the image 31. The computing apparatus 13 can further determine a dimension $d_1$ of the face part 311 of the image 31. With the help of the theory on thin lenses, the computing apparatus 13 can determine the distance $l_1$ between the face portion 21 and the image sensing device 12 with the dimension $d_1$ of the face part 311, where the focus length of the image sensing device 12 and the actual size of the face portion 12 are known. The dimension $d_1$ used for determining the distance $l_1$ between the face portion 21 and the image sensing device 12 is not limited to the width of the face portion 21. The length of the face portion 21 or the like can be a choice. The distance $l_2$ between the image sensing device 12 and the hand portion 22 and the distance $l_3$ between the image sensing device 12 and the hand portion 23 can be determined with the following equations (1) and (2).

$$l_2 = l_1 \times \sqrt{\frac{I_1}{I_2}} \quad (1)$$

$$l_3 = l_1 \times \sqrt{\frac{I_1}{I_3}} \quad (2)$$

Figure 4:
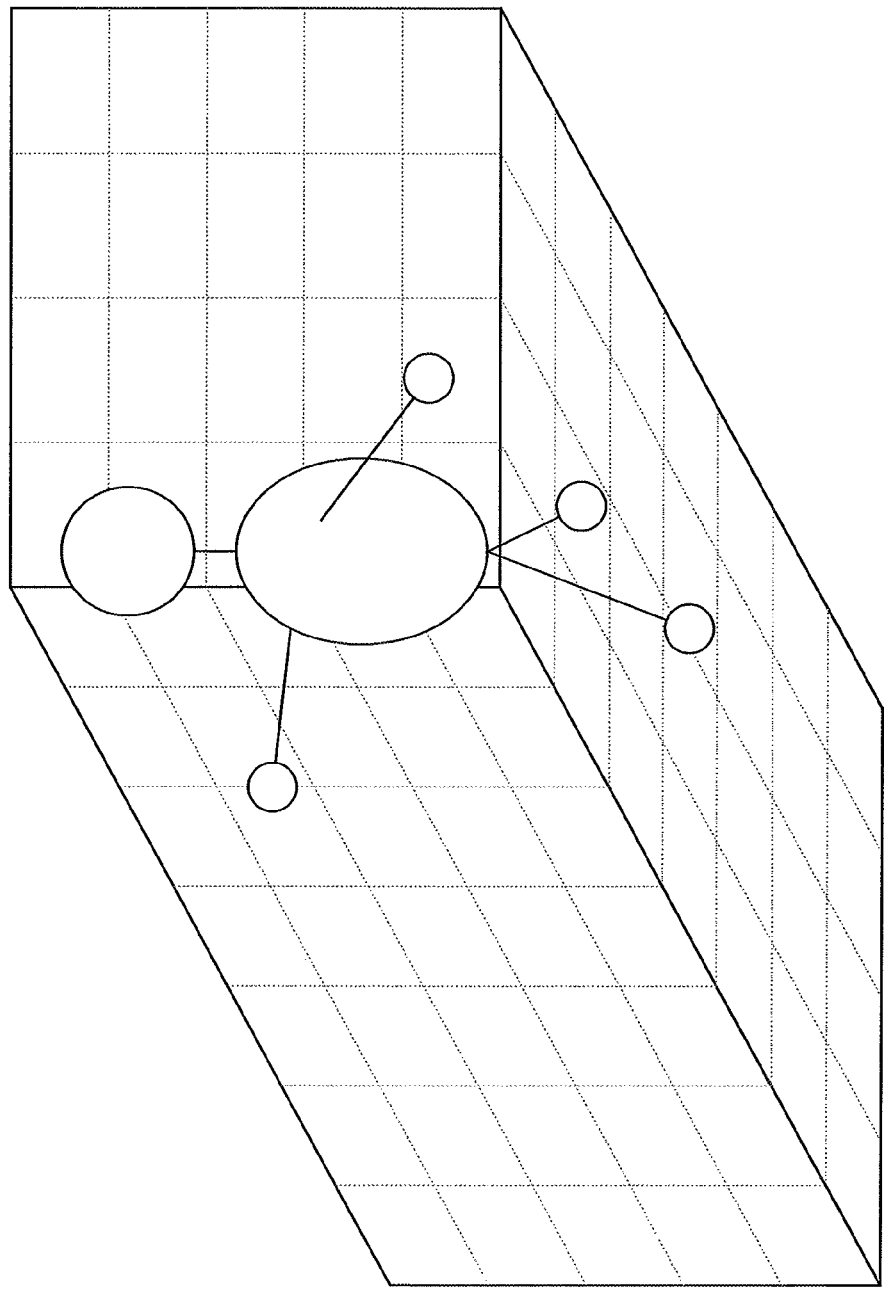
FIG. 4 schematically demonstrates a three-dimensional image according to one embodiment of the present invention.
Figure 5:
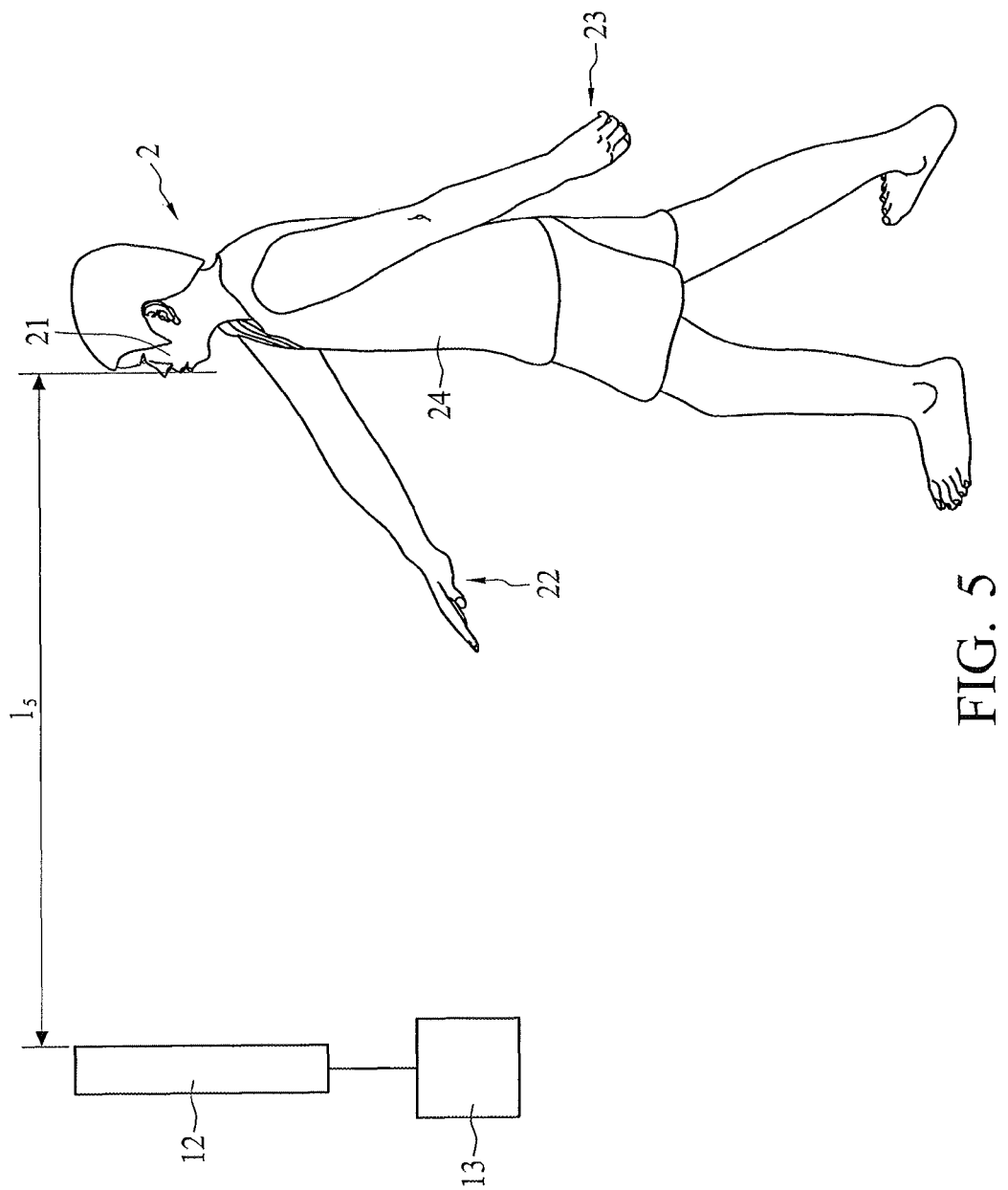
FIG. 5 is a schematic illustration depicting an image system and an object according to another embodiment of the present invention.
Figure 6:
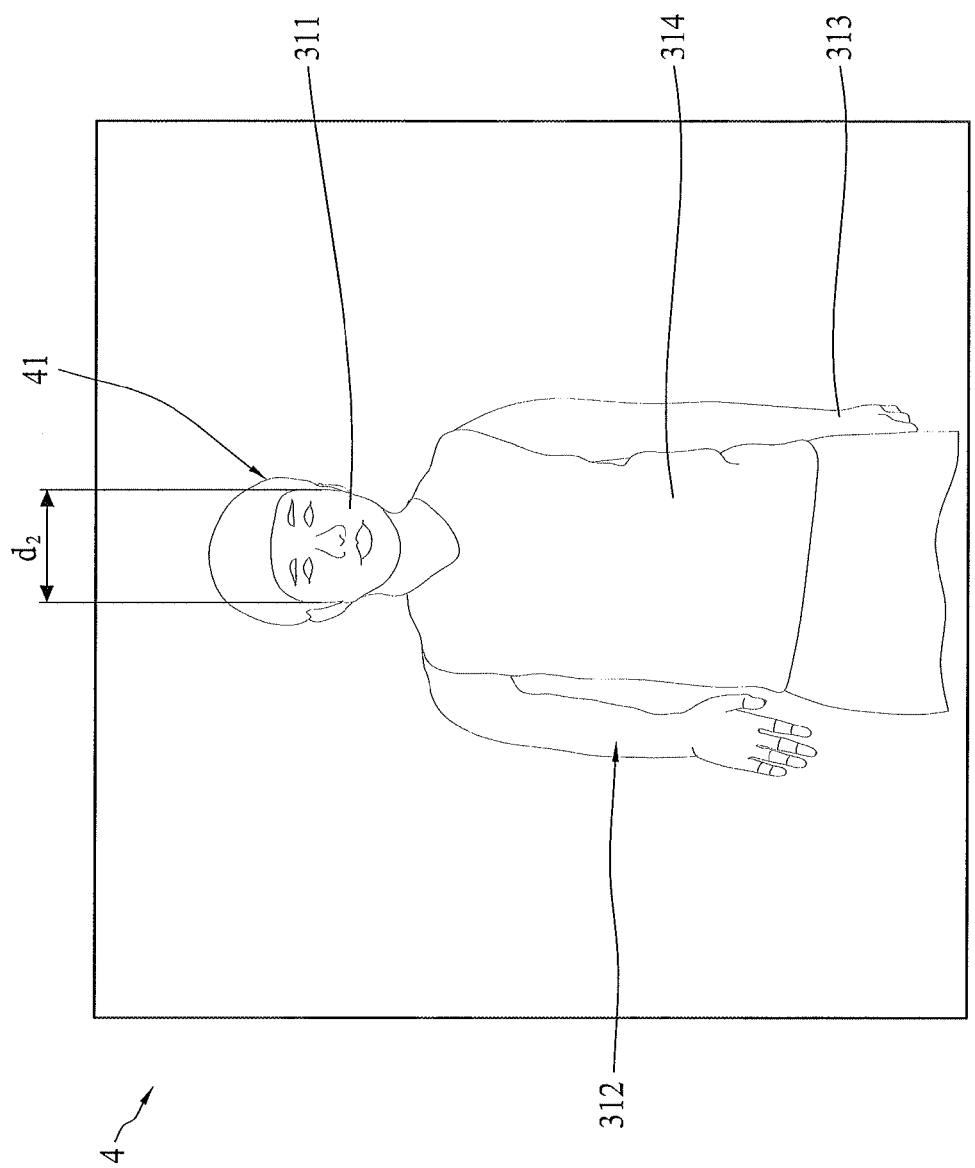
FIG. 6 is a schematic illustration of a picture according to another embodiment of the present invention.

The distances between the image sensing device 12 and other portions of the object 2, such as foot portions, can be determined using such method. The computing apparatus 13 may construct a three-dimensional image, as shown in FIG. 4, using the distances between each portion of the object 2 and the image sensing device 12 and the image 31 of the picture 3.

In the above embodiments, skin reflects light in the face portion 21, the hand portion 22, and the hand portion 23 of the object 2. Therefore, these portions (21, 22, and 23) have similar reflectance so that when determining distances, the effect of reflectance can be ignored. The object 2 may include other portions, for example, a body portion wearing clothes, having reflectance different from that of skin. When using a portion, such as the face portion 21 of the object 2, to determine the distance between the body portion 24 and the image sensing device 12, the difference between the reflectance of the body portion 24 and the face portion 21 needs to be considered.

If the skin has a reflectance of A, the intensity value $I_4$ represents the body part 314 of the image 31, and if the body portion 24 has a reflectance of A', the distance $l_4$ between the body portion 24 and the image sensing device 12 can be calculated using the following equation (3).

$$l_4 = l_1 \times \sqrt{\frac{I_1 \times A'}{I_4 \times A}} \quad (3)$$

In some embodiments, a portion of the object 2 can also be calculated. For example, the face portion 21 and the body portion 24 of the object 2 are connected, and if the face portion 21 and the body portion 24 of the object 2 stay straight, the two portions (21 and 24) have substantially the same distance to the image sensing device 12. If the body part 314 of the image 31 has a reflectance of $I_4$ and the face part 311 has a reflectance of $I_1$, the reflectance A' of the body portion 24 can be determined by the following equation (4).

$$A' = \frac{I_4}{I_1} \times A \quad (4)$$

In some embodiments, a travel distance of an object can be determined according to the intensity values of two pictures. With the face portion 21 of the object 2 as an example, referring to FIGS. 2, 3, 5 and 6, when the face portion 21 of the object 2 is distant by $l_1$ from the image sensing device 12, the image sensing device 12 generates a picture 3, and the intensity value $I_1$ representing the face part 311 can be determined from the image 31 of the picture 3. As mentioned above, the distance $l_1$ between the face portion 21 of the object 2 and the image sensing device 12 can be estimated using a dimension d1 of the face part 311.

After the object 2 moves to a location where its face portion 21 is distant by $l_5$ from the image sensing device 12, the image sensing device 12 generates a picture 4. The intensity value $I_5$ representing the face part 311 of the image 41 of the picture 4 can then be obtained. The distance $l_5$ can be determined using the distance $l_1$, the intensity value $I_1$, and the intensity value $I_5$.

In some embodiments, a dimension $d_2$ of the image 41 can be obtained. Similarly, with the help of the theory on thin lenses, the distance $l_5$ can be calculated using the dimension $d_2$. In some embodiments, when the distance $l_5$ determined by the theory on thin lenses is different from the distance $l_5$ determined by the inverse-square law, the two distances $l_5$ are averaged or averaged by weighted to obtain a calibration distance. In some embodiments, the distance $l_5$ determined by the theory on thin lenses can be used as a basis to correct the reflectance of the corresponding portion of the object 2 such that the distance determined by the inverse-square law and intensity values can be similar to the distance determined by the theory on thin lenses.

In some embodiments, referring to FIGS. 2, 3, 5, and 6, the image sensing device 12 may generate a plurality of pictures 3 and 6. Each picture 3 or 6 may comprise an image 31 or 41 produced by the object 2. Each image 31 or 41 may comprise a plurality of parts (311, 312, 313, and 314) corresponding to the plurality of portions (21, 22, 23, and 24) of the object 2. The computing apparatus 13 is configured to compare the positions of the plurality of parts (311, 312, 313, and 314) of the images 31 with the positions of the plurality of parts (311, 312, 313, and 314) of the images 41 to determine the change of the position of the object 2 in a transverse direction relative to the image sensing device 12. Furthermore, the computing apparatus 13 can determine the travel distance of each portion (21, 22, 23, or 24) of the object 2 caused by the movement of the portion (21, 22, 23, or 24) toward or away from the image sensing device 12 using the intensity values respectively representing the parts (311, 312, 313, and 314) of the images 31 and 41. The computing apparatus 13 can further determine the relative three-dimensional motion of each portion (21, 22, 23, or 24) of the object 2 and thereby generate corresponding motion signals.

Figure 7:
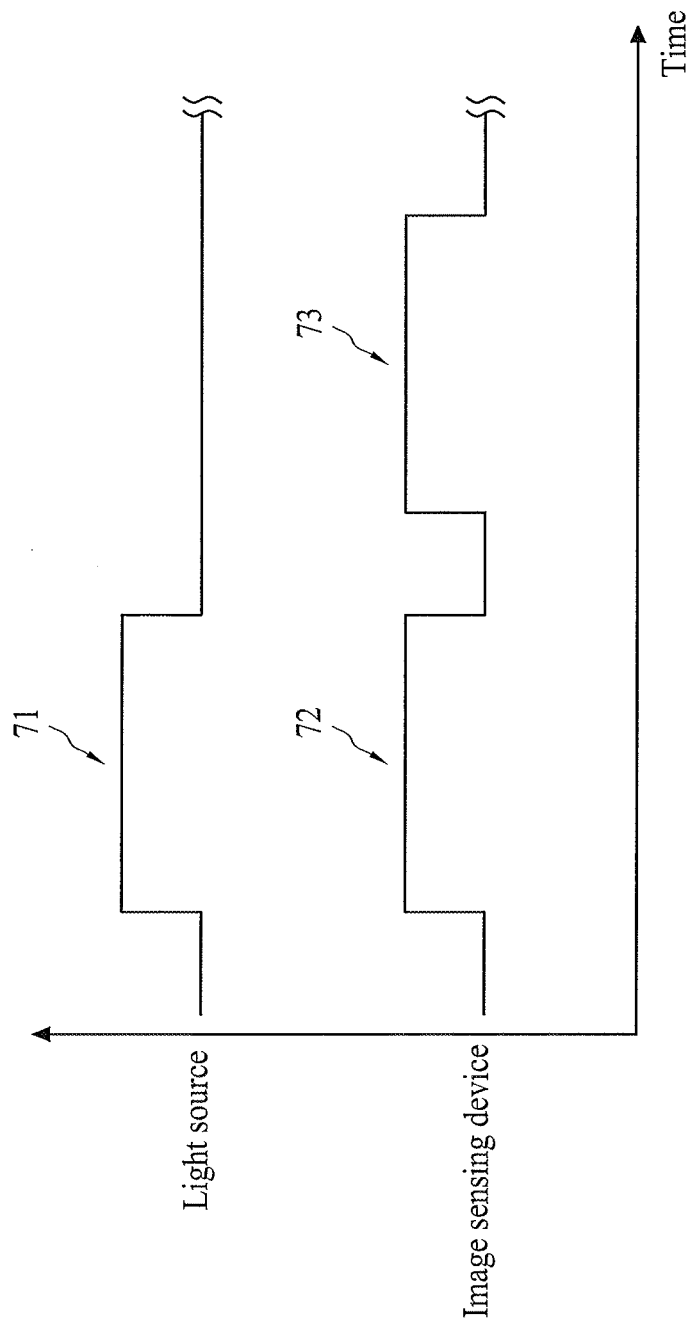
FIG. 7 is a timing diagram demonstrating the operations of a light source and an image sensing device according to one embodiment of the present invention.

Referring to FIG. 7, the object 2 may reflect light that does not come from the light source 11, accordingly change the intensities of the image 31 of the picture 3, thereby causing a distance calculation error. In some embodiments, during the period 71 the light source is turned on, the image sensing device 12 is activated for an image-capturing period 72 to generate a picture taken with a flash; and when the light source is turned off, the image sensing device 12 is activated for another image-capturing period 73 to generate a picture taken without a flash. The picture 3 can be obtained is by subtracting the picture taken without a flash from the picture taken with a flash. As a result, the error caused by the light that does not come from the light source can be reduced.

Figure 10:
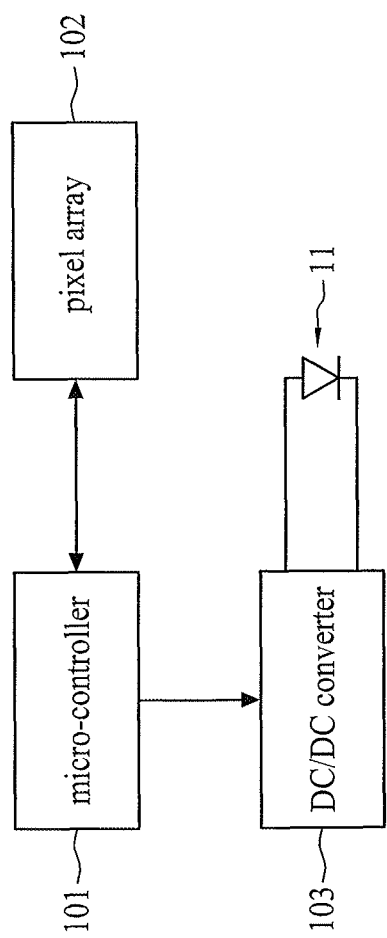
FIG. 10 is a block diagram illustrating a portion of functions of an image system according to one embodiment of the present invention.

Referring to FIG. 10, in some embodiments, the image system 1 may comprise a micro-controller 101, a DC/DC converter 103, a pixel array 102, and a light source 11. The DC/DC converter 103 is coupled with the light source 11 for providing electricity. The micro-controller 101 is coupled with the DC/DC converter 103 and the pixel array 102 for controlling the electricity supply and the capturing of images. The micro-controller 101 can be programmed to control the pixel array 102 to generate a picture taken with a flash when the light source 11 is turned on, and to generate a picture taken without a flash when the light source 11 is turned off.

In some embodiments, the activation time of the light source 11 of the image system 1 is adjustable such that the intensity value of at least one portion of the image 31 is in a predetermined range. Referring to FIG. 2, in some embodiments, the image system 1 can adjust the activation time of the light source 11 so that the intensity value representing the face part 311 of the image 31 can fall within a predetermined intensity range, while the present invention is not limited to such embodiments. After the image 31 is captured, the face part 311 of the image 31 is identified. The present image identification technologies can be applied to identify the face part 311 of the image 31. After the face part 311 of the image 31 is identified, an intensity value representing the face part 311 of the image 31 can be calculated. The intensity value can be an average of the intensities of the pixels of the face part 311, an average of the intensities of a portion of pixels of the face part 311, or an intensity value sufficiently representing the face part 311. Thereafter, the intensity value representing the face part 311 is compared with a predetermined intensity range. If the intensity value representing the face part 311 is not within the predetermined intensity range, the activation time of the light source 11 is decreased or increased to adjust the intensity value representing the face part 311 to be within the predetermined intensity range.

In some embodiments, the exposure time of the image sensing device 12 of the image system 1 is adjustable such that the intensity value of at least one portion of the image 31 can be within a predetermined intensity range. In some embodiments, the image system 1 adjusts the exposure time of the image sensing device 12 so that the face part 311 of the image 31 falls within a predetermined intensity range; however, the present invention is not limited to such embodiments. In some embodiments, after the face part 311 of the image 31 is identified, the intensity value representing the face part 311 of the image 31 can be calculated. Thereafter, the intensity value representing the face part 311 is compared with a predetermined intensity range. If the intensity value representing the face part 311 is not within the predetermined intensity range, the exposure time of the image sensing device 12 is decreased or increased to adjust the intensity value representing the face part 311 to be within the predetermined intensity range.

In some embodiments, the light source 11 is configured to emit invisible light, and the image sensing device 12 is configured to be sensitive to the invisible light. The face part 311 of the image 31 can be directly identified from the picture 3 generated by the image sensing device 12.

Figure 8:
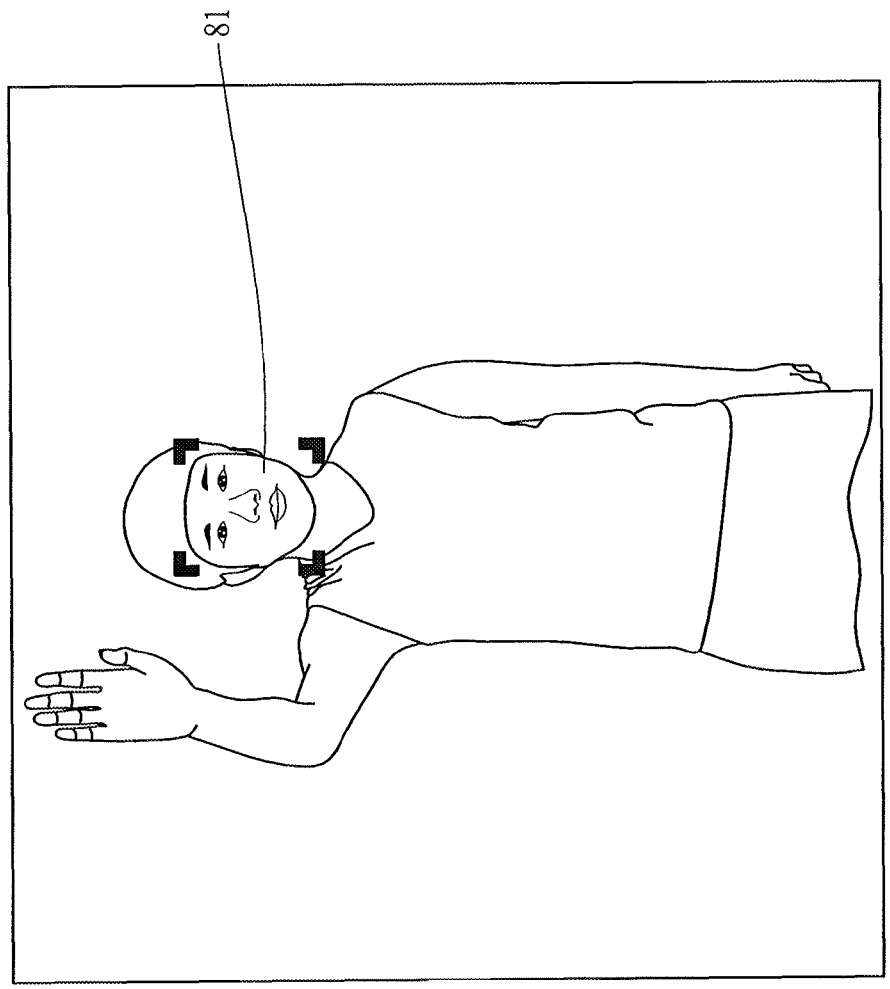
FIG. 8 schematically illustrates a visible light picture according to one embodiment of the present invention.

Referring to FIGS. 2 and 8, in some embodiments, the light source 11 generates invisible light, and the image sensing device 12 is configured to detect the invisible light. The image system 1 may further comprise another image sensing device 14, which is configured to detect visible light. The image sensing device 14 can generate a visible light picture 8 as shown in FIG. 8. The visible light picture 8 may comprise an image 81. The visible light picture 8 can be used for identification of the face part of the image 81 and for determination of the location of the face part. Afterward, at the same location, intensity values are determined from a picture taken with a flash and a picture taken without a flash, respectively. The difference between the intensity values is compared with a predetermined intensity range for adjusting exposure time. Subsequently, the distances between other portions of the object and the image sensing device 12 are determined by the size of the face part and the intensity value representing the face part.

In some embodiments, as shown in FIG. 8, when the object 2 is a human being, the location of his face is detected preferably using the image of a visible light picture 8. The image system 1 first generates a visible light picture 8, then, the location of the human face is identified and/or a dimension representing the human face is determined. Thereafter, invisible light is generated and an invisible light picture is obtained. Finally, the gesture or movement of the object is determined using the invisible light picture.

In some embodiments, the light source 11 emits infrared light, and the image sensing device 12 is configured to correspondingly detect infrared light.

In some embodiments, the image sensing device 12 or 14 comprises a global shutter image sensor.

Figure 12:
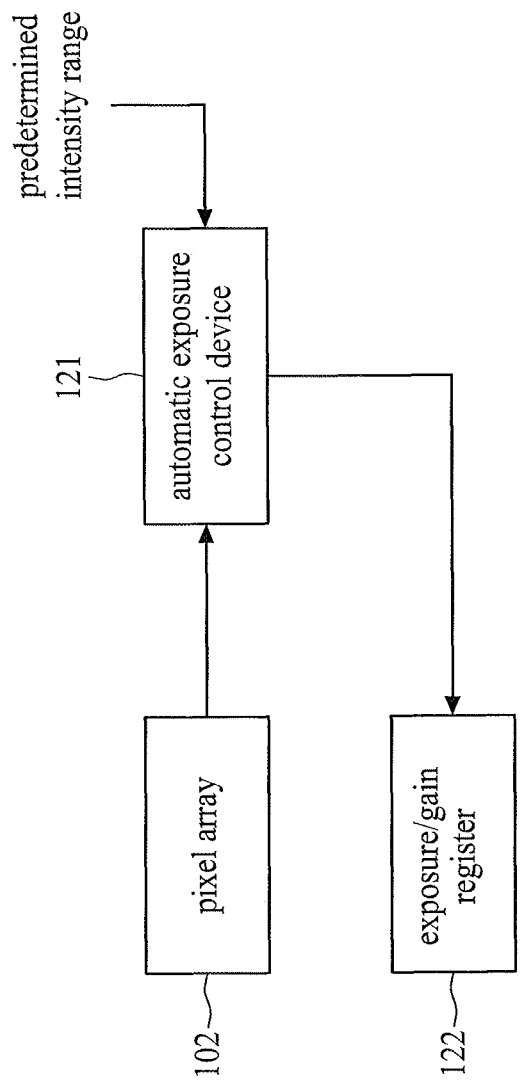
FIG. 12 is a block diagram illustrating an automatic exposure control device according to one embodiment of the present invention.

The image sensing device 12 or 14 may comprise an automatic exposure control device. In some embodiments, as shown in FIG. 12, the image sensing device 12 or 14 may comprise a pixel array 102, an automatic exposure control device 121, and an exposure/gain register 122. The pixel array 102 receives light to generate a picture. The automatic exposure control device 121 is coupled with the pixel array 102 to receive the picture generated by the pixel array 102. The automatic exposure control device 121 can compare a portion of the image of the picture and a predetermined intensity range, and determine an exposure/gain value. The exposure/gain register 122 is coupled with the pixel array 102 and the automatic exposure control device 121 and can store the exposure/gain value, which is used to control the exposure time of the pixel array 102. The above embodiment is an example, which should not be used to limit the present invention.

Figure 9:
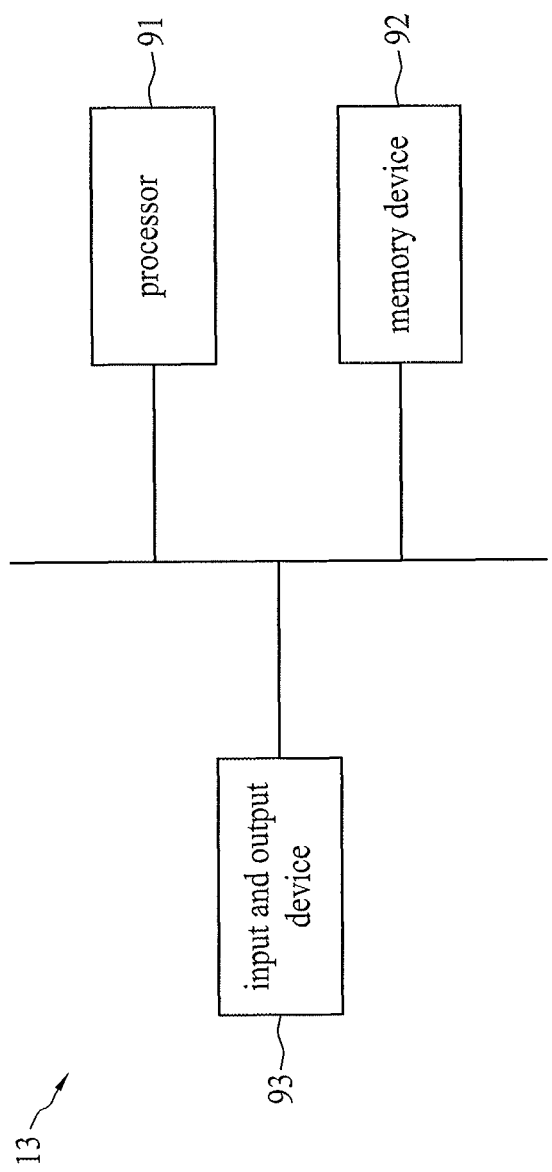
FIG. 9 is a block diagram illustrating a computing apparatus according to one embodiment of the present invention.

As shown in FIG. 9, in some embodiments, the computing apparatus 13 may comprise a processor 91, a memory device 92, and an input/output device 93. The memory device 92 can store the programs for operating the computing apparatus 13, the programs for performing the methods of the embodiments of the present disclosure, and the data required for performing the afore-mentioned programs. The processor 91 is configured to execute programs. The input/output device 93 can couple with an external device such as a communication device and an image sensing device.

Figure 11:
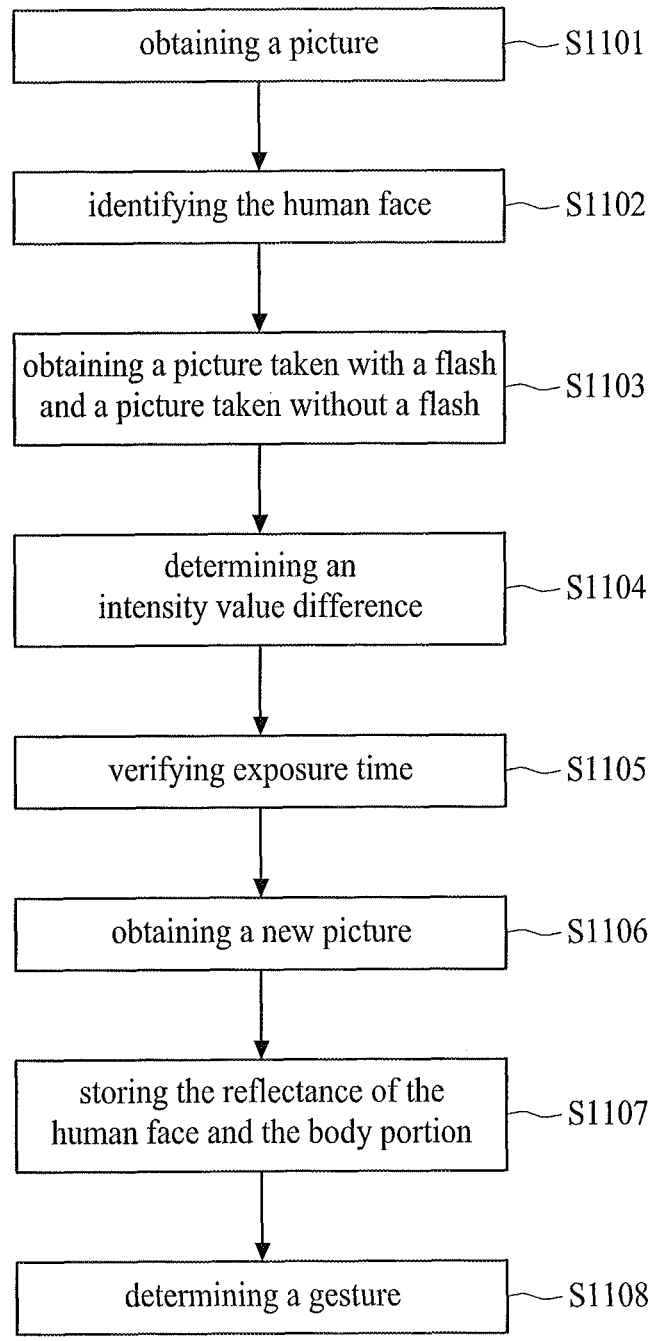
FIG. 11 is a flow diagram demonstrating the steps of a method of detecting a gesture according to one embodiment of the present invention.

One embodiment of the present invention discloses a method of detecting a gesture. Referring to FIG. 11, in Step S1101, a picture is obtained, which comprises an image of a human being. The picture can be generated by an image sensing device for detecting visible light or an image sensing device for detecting invisible light. In Step S1102, the human face of the picture is identified and the location of the human face is determined. The picture used to identify the human face can be a visible light picture or an invisible light picture. In Step S1103, a picture taken with a flash and a picture taken without a flash are obtained. In Step S1104, a difference value is determined between the intensity value representing, the human face of the picture taken with a flash and the intensity value representing the human face of the picture taken without a flash. In Step S1105, the difference value is compared with a predetermined intensity range. If the difference value is not in the predetermined intensity range, the activation time of the light source or the exposure time of the image sensing device is adjusted. In Step S1106, a new picture is generated. In Step S1107, the reflectance of the human face and the body portion is determined and stored. The distance between the human face and the image sensing device can be determined using a dimension of the human face of the image. The reflectance of the body portion can be determined using the intensity values representing the human face and the body portion. In Step S1108, distances between other portions of the object and the image sensing device can be determined using the distance between the human face of the object and the image sensing device, the intensity value representing the human face of the image, and the intensity values representing other portions of the image of the human being. A three-dimensional human image can be constructed using the above distances and the gesture of the object can be determined accordingly. In some embodiments, the movement or the gesture of the object can be determined using a newly captured picture, the distance between the human face and the image sensing device, and the intensity value representing the human face of the image.

In some embodiments, the system may store a predetermined human face reflectance. The inaccuracy between the calculated distances from the human face to the image sensing device can be applied to modify the stored predetermined human face reflectance to obtain a new human face reflectance, which is then stored back to the system.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An image system comprising:
   a light source configured to illuminate an object comprising at least one portion;
   an image sensing device configured to generate a picture comprising an image produced by the object, wherein the image comprises at least one part corresponding to the at least one portion of the object; and
   a computing apparatus configured to determine an intensity value representing the at least one part of the image and to determine at least one distance between the at least one portion of the object and the image sensing device using the intensity value and a dimension of the at least one part of the image, wherein the picture is obtained by subtracting a picture that is taken when the light source is turned off from a picture that is taken when the light source is turned on.

2. The image system of claim 1, wherein the object comprises a plurality of portions, and the computing apparatus determines a plurality of first distances corresponding to the plurality of portions and a three-dimensional image using the plurality of first distances and the picture.

3. The image system of claim 1, wherein the light source emits invisible light and the image sensing device is configured to detect the invisible light.

4. The image system of claim 3, wherein the light source emits infrared light and the image sensing device is configured to detect infrared light.

5. The image system of claim 3, further comprising a visible light image sensing device configured to generate a visible light picture comprising an image of the object, wherein the computing apparatus determines a position of the at least one part of the image of the picture and the dimension using the visible light picture.

6. The image system of claim 1, wherein the image sensing device is a global shutter image sensor.

7. The image system of claim 1, wherein the computing apparatus compares the intensity value representing the at least one part of the image with a predetermined intensity range to determine either the time during which the light source is turned on or the exposure time of the image sensing device.

8. An image system comprising:
   a light source configured to illuminate an object comprising at least one portion;
   an image sensing device configured to generate a picture comprising an image produced by the object, wherein the image comprises at least one part corresponding to the at least one portion of the object; and
   a computing apparatus configured to determine an intensity value representing the at least one part of the image and to determine at least one distance between the at least one portion of the object and the image sensing device using the intensity value and a dimension of the at least one part of the image, wherein the image sensing device is a global shutter image sensor,
   wherein the image sensing device comprises a pixel array and an automatic exposure control device coupled with the pixel array, and
   wherein the automatic exposure control device is configured to compare the intensity value representing the at least one part of the image with a predetermined intensity range to determine an exposure control value, which is used to determine exposure time of the pixel array.

9. An image system comprising:
   a light source configured to illuminate an object comprising at least one portion;
   an image sensing device configured to generate a picture comprising an image produced by the object, wherein the image comprises at least one part corresponding to the at least one portion of the object; and
   a computing apparatus configured to determine an intensity value representing the at least one part of the image and to determine at least one distance between the at least one portion of the object and the image sensing device using the intensity value and a dimension of the at least one part of the image, wherein the object comprises two connected portions and the image comprises two connected parts corresponding to the two connected portions, and
   wherein the computing apparatus determines intensity values respectively representing the two connected parts and a second distance between one of the two connected portions and the image sensing device, and reflectance of another of the two connected portions, according to the intensity values respectively representing the two connected parts and the second distance.

10. An image system comprising:
    a light source configured to illuminate an object comprising at least one portion;
    an image sensing device configured to generate a picture comprising an image produced by the object, wherein the image comprises at least one part corresponding to the at least one portion of the object; and
    a computing apparatus configured to determine an intensity value representing the at least one part of the image and to determine at least one distance between the at least one portion of the object and the image sensing device using the intensity value and a dimension of the at least one part of the image, wherein the computing apparatus determines two third distances between two portions of the object respectively corresponding to two parts of the image and the image sensing device by dimensions of the two parts of the image, and checks one of the two third distances with another of the two third distances.

11. An image system comprising:
    a light source configured to illuminate an object comprising at least one portion;

an image sensing device configured to generate a picture comprising an image produced by the object, wherein the image comprises at least one part corresponding to the at least one portion of the object; and a computing apparatus configured to determine an intensity value representing the at least one part of the image and to determine at least one distance between the at least one portion of the object and the image sensing device using the intensity value and a dimension of the at least one part of the image, wherein the computing apparatus determines two fourth distances between two portions of the object respectively corresponding to two parts of the image and the image sensing device by dimensions of the two parts of the image, and checks reflectance of one of the two portions with the two fourth distances.

12. An image system comprising:

a light source configured to illuminate an object comprising a first portion and a second portion connected with the first portion, wherein the first portion comprises reflectance different from that of the second portion;

an image sensing device configured to generate a picture comprising an image produced by the object, the image comprising a first part corresponding to the first portion of the object and a second part corresponding to the second portion of the object; and a computing apparatus configured to determine reflectance of the second portion of the object using an intensity value representing the first part of the image and an intensity value representing the second part of the image, wherein the computer apparatus compares the intensity value representing the first part of the image with a predetermined intensity range to determine either the time during which the light source is turned on or the exposure time of the image sensing device.

13. The image system of claim 12, wherein the computing apparatus determines a dimension of the first part of the image and a distance between the first portion of the object and the image sensing device by the dimension.

14. The image system of claim 12, wherein the light source emits invisible light and the image sensing device detects the invisible light, and the image system further comprises a visible light image sensing device that determines a position of the first part of the image and a dimension of the first part of the image.

15. The image system of claim 14, wherein the light source emits infrared light and the image sensing device detects infrared light.

16. The image system of claim 12, wherein the image sensing device detects visible light.

17. The image system of claim 12, wherein the image sensing device is a global shutter image sensor.

18. An image system comprising:

a light source configured to illuminate an object comprising a first portion and a second portion connected with the first portion, wherein the first portion comprises reflectance different from that of the second portion;

an image sensing device configured to generate a picture comprising an image produced by the object, the image comprising a first part corresponding to the first portion of the object and a second part corresponding to the second portion of the object; and a computing apparatus configured to determine reflectance of the second portion of the object using an intensity value representing the first part of the image and an intensity value representing the second part of the image, wherein the picture is obtained by subtracting a picture that is taken when the light source is turned off from a picture that is taken when the light source is turned on.

19. An image system comprising:

a light source configured to illuminate an object comprising a first portion and a second portion connected with the first portion, wherein the first portion comprises reflectance different from that of the second portion;

an image sensing device configured to generate a picture comprising an image produced by the object, the image comprising a first part corresponding to the first portion of the object and a second part corresponding to the second portion of the object; and a computing apparatus configured to determine reflectance of the second portion of the object using an intensity value representing the first part of the image and an intensity value representing the second part of the image, wherein the image sensing device is a global shutter image sensor, and wherein the image sensing device comprises a pixel array and an automatic exposure control device coupled with the pixel array, wherein the automatic exposure control device compares the intensity value representing the first part of the image with a predetermined intensity range to determine an exposure control value, which is used to control exposure time of the pixel array.

20. An image system comprising:

a light source configured to illuminate an object;

an image sensing device configured to generate, in sequence, a first picture and a second picture respectively comprising an image produced by the object;

a computing apparatus configured to determine a distance between the object and the image sensing device by the image of the first picture, to determine a first intensity value representing the image of the first picture and a second intensity value representing the image of the second picture and corresponding to the first intensity value, and to determine a travel distance of the object from the time that the first picture is generated until the time that the second picture is generated using the first intensity value, the second intensity value, and the distance; and a visible light image sensing device configured to generate a visible light picture comprising an image of the object, wherein the computing apparatus determines a position and a dimension of a part of the image of the first or second picture, and wherein the light source emits invisible light and the image sensing device detects the invisible light.

21. The image system of claim 20, wherein the image sensing device detects visible light.

22. The image system of claim 20, wherein the image sensing device is a global shutter image sensor.

23. An image system comprising:

a light source configured to illuminate an object;

an image sensing device configured to generate, in sequence, a first picture and a second picture respectively comprising an image produced by the object;

a computing apparatus configured to determine a distance between the object and the image sensing device by the image of the first picture, to determine a first intensity value representing the image of the first picture and a second intensity value representing the image of the second picture and corresponding to the first intensity value, and to determine a travel distance of the object from the time that the first picture is generated until the time that the second picture is generated using the first intensity value, the second intensity value, and the distance, wherein the image sensing device is a global shutter image sensor, wherein image sensing device comprises a pixel array and an automatic exposure control device coupled with the pixel array, and wherein the automatic exposure control device compares the first intensity value with a predetermined intensity range to determine an exposure control value, which is used to determine exposure time of the pixel array.

24. An image system comprising:
a light source configured to illuminate an object comprising a plurality of portions;
an image sensing device configured to generate a plurality of pictures with each comprising an image produced by the object and each image comprising a plurality of parts corresponding to the plurality of portions; and
a computing apparatus configured to generate motion signals corresponding to the plurality of portions of the object according to changes in positions and intensity values of the plurality of parts of the images, wherein each picture is obtained by subtracting a picture that is taken when the light source is turned off from a picture that is taken when the light source is turned on.

25. The image system of claim 24, wherein the computing apparatus determines a three-dimensional image of the object according to the positions and the intensity values of each image.

26. The image system of claim 24, wherein the light source emits invisible light and the image sensing device detects the invisible light.

27. The image system of claim 26, further comprising a visible light image sensing device configured to generate a visible light picture comprising an image of the object, wherein the computing apparatus determines the position and a dimension of one of the parts of the image of one picture using the image of the visible light picture.

28. The image system of claim 24, wherein the image sensing device is a global shutter image sensor.

29. An image system comprising:
a light source configured to illuminate an object comprising a plurality of portions;
an image sensing device configured to generate a plurality of pictures with each comprising an image produced by the object and each image comprising a plurality of parts corresponding to the plurality of portions; and
a computing apparatus configured to generate motion signals corresponding to the plurality of portions of the object according to changes in positions and intensity values of the plurality of parts of the images, wherein the image sensing device is a global shutter image sensor,
wherein the image sensing device comprises a pixel array and an automatic exposure control device coupled with the pixel array, and
wherein the automatic exposure control device compares the intensity value representing one of the parts of one of the images with a predetermined intensity range to determine an exposure control value, which is used to determine exposure time of the pixel array.

30. An image system comprising:
a light source configured to illuminate an object comprising a plurality of portions;
an image sensing device configured to generate a plurality of pictures with each comprising an image produced by the object and each image comprising a plurality of parts corresponding to the plurality of portions; and
a computing apparatus configured to generate motion signals corresponding to the plurality of portions of the object according to changes in positions and intensity values of the plurality of parts of the images,
wherein the image sensing device is a global shutter image sensor, and
wherein the computing apparatus compares the intensity value representing one of the parts of one of the images with a predetermined intensity range to determine either the time during which the light source is turned on or the exposure time of the image sensing device.

* * * * *